United States Patent
Miyamoto et al.

(10) Patent No.: US 8,910,085 B2
(45) Date of Patent: Dec. 9, 2014

(54) INFORMATION PROCESSING PROGRAM AND INFORMATION PROCESSING APPARATUS

(75) Inventors: Shigeru Miyamoto, Kyoto (JP); Takaya Imamura, Kyoto (JP); Yusuke Akifusa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 935 days.

(21) Appl. No.: 12/539,820

(22) Filed: Aug. 12, 2009

(65) Prior Publication Data

US 2010/0083187 A1 Apr. 1, 2010

(30) Foreign Application Priority Data

Sep. 30, 2008 (JP) ................................. 2008-252532

(51) Int. Cl.
| | |
|---|---|
| G06F 3/048 | (2013.01) |
| G06F 3/0488 | (2013.01) |
| G06F 3/0482 | (2013.01) |
| G06F 3/0484 | (2013.01) |
| G06F 3/0481 | (2013.01) |

(52) U.S. Cl.
CPC .......... *G06F 3/04886* (2013.01); *G06F 3/0488* (2013.01); *G06F 3/04812* (2013.01); *G06F 3/0482* (2013.01); *G06F 3/04847* (2013.01)
USPC ............ 715/856; 715/862; 725/112; 725/135

(58) Field of Classification Search
CPC .............. G06F 3/04812; G06F 3/0482; G06F 3/04847; G06F 3/0488
USPC ........... 715/862, 856; 707/3, 102, 1; 725/112, 725/135, 256
See application file for complete search history.

(56) References Cited

U.S. PATENT DOCUMENTS

| | | | | | |
|---|---|---|---|---|---|
| 3,325,787 | A | * | 6/1967 | Angell et al. | 382/155 |
| 3,715,812 | A | * | 2/1973 | Novak | 434/170 |
| 3,793,471 | A | * | 2/1974 | Mason et al. | 434/114 |
| 5,515,631 | A | * | 5/1996 | Nardy et al. | 40/518 |
| 5,550,754 | A | * | 8/1996 | McNelley et al. | 348/14.01 |

(Continued)

FOREIGN PATENT DOCUMENTS

| | | |
|---|---|---|
| JP | 2003-256465 | 9/2003 |
| JP | 2005-20756 | 8/2005 |

OTHER PUBLICATIONS

Author Unknown, XY Coordinates after clicking a button, Jan. 28, 2004, http://weblogs.asp.net/pleloup/archive/2004/01/28/63959.aspx.*

(Continued)

*Primary Examiner* — Tuyetlien Tran
(74) *Attorney, Agent, or Firm* — Nixon & Vanderhye, P.C.

(57) ABSTRACT

A game apparatus as one example of an information processing apparatus includes an LCD, a touch panel provided to the LCD, and a CPU core. The CPU core displays a "Yes" button to which a command of allowing save of temporarily-stored sound data is assigned, on the LCD. When a designating operation of an arbitrary position within the displayed button is performed with a stick or the like, which position within the button is designated is specified through a touch panel, a condition is set to the command on the basis of the specified position, and information processing in relation to the command is executed according to the set condition.

11 Claims, 17 Drawing Sheets

(56) References Cited

U.S. PATENT DOCUMENTS

| | | | |
|---|---|---|---|
| 5,715,416 A * | 2/1998 | Baker | 715/839 |
| 5,812,688 A * | 9/1998 | Gibson | 381/119 |
| 5,844,560 A * | 12/1998 | Crutcher et al. | 715/840 |
| 6,279,017 B1 * | 8/2001 | Walker | 715/201 |
| 6,377,249 B1 * | 4/2002 | Mumford | 345/179 |
| 6,466,197 B1 * | 10/2002 | Kim et al. | 345/156 |
| 6,507,345 B1 * | 1/2003 | Tojo | 345/473 |
| 6,567,070 B1 * | 5/2003 | Light et al. | 345/157 |
| 6,717,578 B1 * | 4/2004 | Deering | 345/428 |
| 6,765,557 B1 * | 7/2004 | Segal et al. | 345/173 |
| 6,780,112 B2 * | 8/2004 | Kikukawa et al. | 463/33 |
| 6,781,575 B1 * | 8/2004 | Hawkins et al. | 345/173 |
| 7,127,271 B1 * | 10/2006 | Fujisaki | 455/556.1 |
| 8,274,479 B2 * | 9/2012 | Prest et al. | 345/169 |
| 2001/0010514 A1 * | 8/2001 | Ishino | 345/158 |
| 2002/0156855 A1 * | 10/2002 | Ueno | 709/206 |
| 2003/0090479 A1 * | 5/2003 | Tey et al. | 345/204 |
| 2003/0140121 A1 * | 7/2003 | Adams | 709/219 |
| 2004/0076931 A1 * | 4/2004 | Rogan et al. | 434/107 |
| 2004/0119755 A1 * | 6/2004 | Guibourge | 345/827 |
| 2004/0179039 A1 * | 9/2004 | Blattner et al. | 345/758 |
| 2004/0219496 A1 * | 11/2004 | Stevinson | 434/159 |
| 2005/0039142 A1 * | 2/2005 | Jalon et al. | 715/823 |
| 2005/0159197 A1 | 7/2005 | Tawara | |
| 2006/0001665 A1 * | 1/2006 | Kupersmit | 345/426 |
| 2006/0025036 A1 * | 2/2006 | Boyle et al. | 446/175 |
| 2006/0153007 A1 * | 7/2006 | Chester | 368/12 |
| 2006/0214935 A1 * | 9/2006 | Boyd et al. | 345/473 |
| 2006/0248183 A1 * | 11/2006 | Barton | 709/224 |
| 2006/0294465 A1 * | 12/2006 | Ronen et al. | 715/706 |
| 2007/0002057 A1 * | 1/2007 | Danzig et al. | 345/473 |
| 2007/0004451 A1 * | 1/2007 | Anderson | 455/556.1 |
| 2007/0035513 A1 * | 2/2007 | Sherrard et al. | 345/157 |
| 2007/0229861 A1 * | 10/2007 | Forbush et al. | 358/1.9 |
| 2007/0269773 A1 * | 11/2007 | Slade | 434/98 |
| 2008/0062192 A1 * | 3/2008 | Voliter et al. | 345/591 |
| 2008/0082426 A1 * | 4/2008 | Gokturk et al. | 705/27 |
| 2008/0110323 A1 * | 5/2008 | Bergfeld et al. | 84/626 |
| 2008/0129488 A1 * | 6/2008 | Hill | 340/539.13 |
| 2008/0229200 A1 * | 9/2008 | Fein et al. | 715/716 |
| 2008/0229215 A1 * | 9/2008 | Baron et al. | 715/751 |
| 2008/0274798 A1 * | 11/2008 | Walker et al. | 463/25 |
| 2009/0021524 A1 * | 1/2009 | Lenart-Weary et al. | 345/593 |
| 2010/0251094 A1 * | 9/2010 | Holm et al. | 715/230 |
| 2010/0306678 A1 * | 12/2010 | Kulas | 715/760 |

OTHER PUBLICATIONS

Help.Net, Jan. 28, 2004, XY coordinates ater clicking a button, http://weblogs.asp.net/pleloup/archive/2004/01/28/63959.aspx.*

* cited by examiner

FIG. 13
(A)
(B)
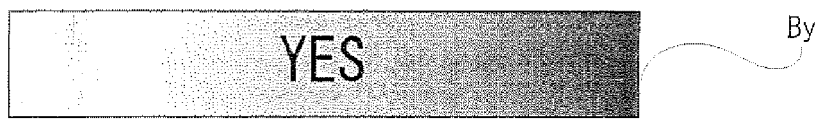
(C)
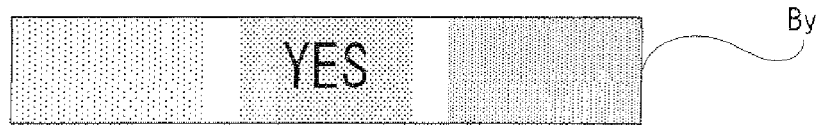
FIG. 14
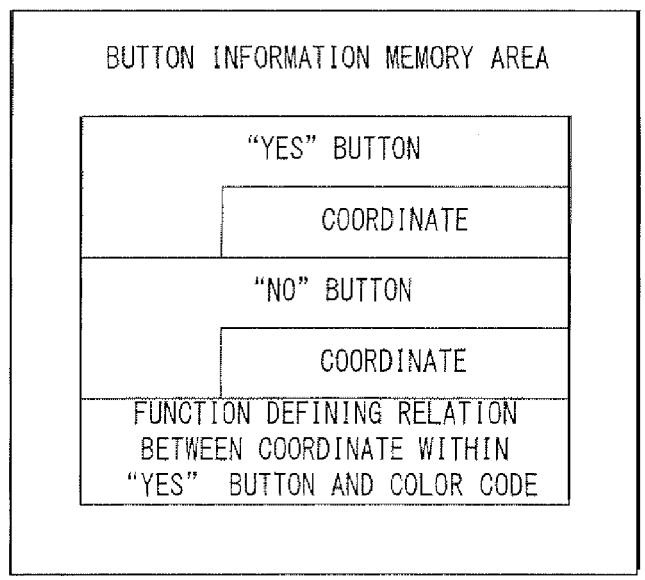

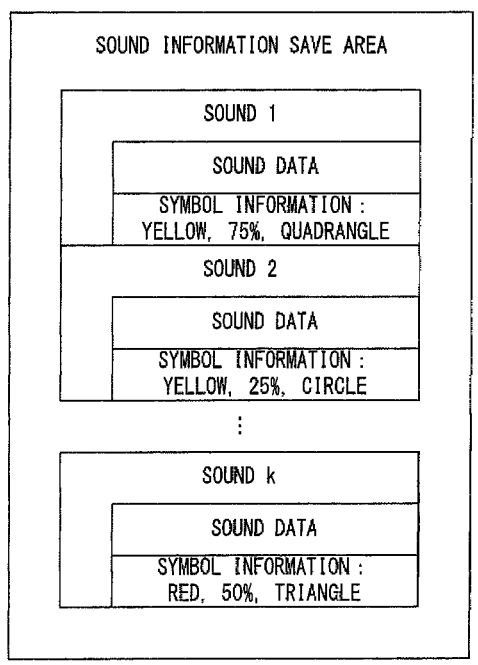

INFORMATION PROCESSING PROGRAM AND INFORMATION PROCESSING APPARATUS

CROSS REFERENCE OF RELATED APPLICATION

The disclosure of Japanese Patent Application No. 2008-252532 is incorporated herein by reference.

BACKGROUND OF THE INVENTION

1. Field of the invention

The invention relates to an information processing program and an information processing apparatus. More specifically, the present invention relates to an information processing program and information processing apparatus capable of displaying a button on a display, and executing information processing according to a button operation with a pointing device.

2. Description of the Related Art

In a program or an apparatus of such a kind, a button (command area) to which a command (instruction) is assigned is displayed on the display, and when a user performs a pushing operation of the button, information processing according to this operation is executed.

For example, in the game program of http:/www.smashbros.com/jp/gamemode/various/various10.html, with respect to a size of the field (a), a button to which a command of "select "small"" is assigned, a button to which a command of "select "medium"" is assigned, a button to which a command of "select "large"" is assigned are displayed (these are called "buttons Ba1-Ba3"), with respect to a design of the background (b), a button to which a command of "select a "first design"" is assigned, a button to which a command of "select a "second design"" is assigned and a button to which a command of "select a "third design"" is assigned are further displayed (these are called "buttons Bb1-Bb3"), with respect to BGM (c), a button to which a command of "select "a first music"" is assigned and a button to which a command of "select "a second music"" is assigned are displayed (these are called "buttons Bc1, Bc2"), and (d) an OK button to which a command of "execute initial setting processing according to the selection results of three items" is assigned is displayed. When the user pushes any one of the buttons Ba1-Ba3, pushes any one of the buttons Bb1-Bb3, pushes any one of the buttons Bc1, Bc2, and then pushes the OK button by utilizing a pointing device, initial setting processing according to the selection results of three items (a)-(c) is executed.

In such a manner, in a general background art, one command is assigned to one button, so that the user has to perform operations as many as the number of commands.

Thereupon, the technique of reducing the number of operations is disclosed in a Japanese Patent Application Laid-Open No. 2003-256465 (Patent Document 1). In the background art, a blue button to which "registration" is assigned and a red button to which "registration" is also assigned are displayed. When the blue button is pushed, a blue background is displayed, and when the red button is pushed, a red background is displayed.

In the background art according to the Patent Document 1, a color selection and a color registration can be performed with one operation. However, since the plurality of buttons to which the same command is assigned are displayed, especially when there are more options, a number of buttons are required as well, so that there is a high possibility of confusing the user by the complex display.

SUMMARY OFF THE INVENTION

Therefore, it is a primary object of the present invention to provide a novel information processing program and a novel information processing apparatus.

Another object of the present invention is to provide an information processing program and an information processing apparatus capable of improving the operability.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is an information processing program causing a computer of an information processing apparatus having a display and a pointing device capable of designating an arbitrary position within the display to function as a display means for displaying a command area to which a command is assigned on the display, a specifying means for specifying which area within the command area is designated when an operation of designating an arbitrary position within the command area displayed by the display means is performed by the pointing device, a setting means for setting a condition to the command on the basis of the position specified by the specifying means, and an executing means for executing information processing in relation to the command according to the condition set by the setting means.

In the first invention, an information processing apparatus (10) has a display (14) and a pointing device (24) capable of designating an arbitrary position within the display. The pointing device, here, is a touch panel provided to the display in the preferred embodiment, but it may be a touch pad, a track ball, a mouse, etc. provided separately from the display. Furthermore, the information to be processed is mainly sound data in the preferred embodiment, but it may be image data, text data, etc.

An information processing program causes a computer (34) of the information processing apparatus to function as a display means (S1), a specifying means (S11), a setting means (S15, S15a), and an executing means (S17, S17a, S55). The display means (S1) displays a command area (By) to which a command is assigned on the display. The command area, here, is a two-dimensional or a three-dimensional input area defined within the virtual space, and has a button shape in the preferred embodiment, but any area such as an icon, an object, etc. may be possible if it is an area to which a command can be assigned.

When an operation of designating an arbitrary position within the command area displayed by the display means is performed by the pointing device, the specifying means specifies which area within the command area is designated, the setting means sets a condition to the command on the basis of the specified position, and the executing means executes information processing in relation to the command according to the set condition. Here, the position designating operation is a pushing operation of a button (correctly, operation of touching a button on the screen with a stick, etc.) in the preferred embodiment, but it may be a double-clicking operation of an icon, and any operation is possible if it is an operation capable of designating an arbitrary position within the command area.

The condition, here, typically corresponds to an adverb modifying a verb if the command is compared to the verb. For example, the condition "red", "large" is set to the command "display a symbol". If different colors are assigned to the respective positions within the command area, a display color of the symbol is changed depending on which area of the command area is pushed. In addition, if the respective positions within the command area are displayed by the colors assigned to the positions, this causes so-called a state that a color pallet is pasted at the command area, so that this allows the user to easily understand which position is to be pushed.

Additionally, in the preferred embodiment, a plurality of areas (E1, E2, . . . ) are assigned to the command area, and a position specifying by the specifying means is performed area by area.

According to the first invention, since a command input and a condition setting can be performed with one operation, it is possible to reduce the number of operations. Furthermore, since there is no need of displaying a plurality of command areas to which the same command is assigned, it is possible to simplify displaying on the display.

A second invention is an information processing program according to the first invention, and the information processing apparatus further includes a first memory for storing a condition assigned to each position within the command area, and the setting means sets a condition assigned to the position specified by the specifying means to the command with reference to the first memory.

In the second invention, the information processing apparatus further includes a first memory (80). The first memory stores a condition assigned to each position within the command area, and the setting means obtains the condition assigned to the specified position from the first memory, and sets the same to the command. It should be noted that the condition may be described in a functional manner, capable of reducing the capacity of the first memory.

A third invention is an information processing program according to the second invention, and the information processing includes information outputting processing, and the condition includes an output manner condition indicating in which manner the information is to be output in the information outputting processing.

A fourth invention is an information processing program according to the third invention, and the information outputting processing includes information displaying processing, and the output manner condition includes a display manner condition indicating in which manner the information is to be displayed in the information displaying processing.

A fifth invention is an information processing program according to the fourth invention, and the display manner condition includes a display color condition.

A sixth invention is an information processing program according to the fifth invention, and the display means displays each position within the command area according to a display color condition assigned to the position with reference to the first memory.

According to the sixth invention, since the display color conditions arranged within the command area can intuitively be recognized, it is possible to improve the operability.

A seventh invention is an information processing program according to the sixth invention, and a display color condition according to a gradation is assigned to each position within the command area.

According to the seventh invention, especially when there are a plurality of colors, it is possible to easily identify the display color conditions arranged within the command area, capable of improving the operability.

An eighth invention is an information processing program according to the first invention, and the command is a command of allowing save of predetermined information, the command area has a button shape, the information processing apparatus further includes a second memory for saving the predetermined information, and the information processing includes information saving processing for adding the condition set by the setting means to the information and saving the same in the second memory.

In the eighth invention, a command of allowing save of the predetermined information is assigned to the command area, and the command area has a button shape. The information processing apparatus further includes a second memory (90), and executes condition setting processing and information saving processing (S17) in response to a designating operation of an arbitrary position within the command area, that is, the button. In the information saving processing, the set condition is saved in the second memory together with the information.

According to the eighth invention, it is possible to perform a condition setting and saving the condition and the predetermined information with one button operation.

A ninth invention is an information processing program according to the eighth invention, and the information processing further includes symbol displaying processing for displaying a symbol image obtained by symbolizing the information saved by the information saving processing on the display, and the condition includes a display manner condition indicating in which manner the symbol image is to be displayed in the symbol displaying processing.

In the ninth invention, an information processing apparatus executes symbol displaying processing (S53) for displaying a symbol image (Sb1, Sb2, . . . ) obtained by symbolizing the information saved by the information saving processing according to the set display manner condition.

According to the ninth invention, the display manner condition is saved together with the information, and therefore, when the symbol of the information is displayed thereafter, the display manner can be controlled, making identification of the information easy.

A tenth invention is an information processing apparatus comprising a display (14), a pointing device (24) capable of designating an arbitrary position within the display, a display means (S1) for displaying a command area (By) to which a command is assigned on the display a specifying means (S11) for specifying which area within the command area is designated when an operation of designating an arbitrary position within the command area displayed by the display means is performed by the pointing device, a setting means (S15, S15a) for setting a condition to said command on the basis of the position specified by said specifying means, and an executing means (S17, S17a, S53) for executing information processing in relation to the command according to the condition set by the setting means (S15, S15a).

In the tenth invention as well, similar to the first invention, it is possible to reduce the number of operations and simplify displaying on the display.

An eleventh invention is an information processing program causing a computer (34) of an information processing apparatus (10) having a display (14) and a pointing device (24) capable of designating an arbitrary position within the display to function as a display means (S1) for displaying a command area (By) to which a predetermined command is assigned on the display, an assigning means (FIG. 8) for assigning a condition setting command to each position within the command area displayed by the display means, a specifying means (S11) for specifying which area within the command area is designated when an operation of designating an arbitrary position within the command area displayed by the display means is performed by the pointing device, a setting means (S15, S15a) for setting a condition to the predetermined command according to the condition setting command assigned to the position specified by the specifying means out of a plurality of condition setting commands assigned to the command area by the assigning means; and an executing means (S17, S17a, S53) for executing information processing in relation to the predetermined command according to the condition set by the setting means.

In the eleventh invention as well, similar to the first invention, it is possible to reduce the number of operations and simplify displaying on the display.

According to the present invention, since the number of operations is reduced, and the displaying is simplified, it is possible to realize the information processing apparatus superior in operability.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 13(A) is an illustrative view showing one modified example of a button;

FIG. 13(B) is an illustrative view showing another modified example of the button;

FIG. 13(C) is an illustrative view showing a still another modified example of the button;

FIG. 14 is an illustrative view showing one modified example of button information;

FIG. 17 is an illustrative view showing one example of an effect-shape correspondence table in FIG. 15 embodiment;

FIG. 18 is an illustrative view showing one example of sound information in FIG. 15 embodiment:

DETAILED DESCRIPTION OF THE PREFERRED EMBODIMENTS

Figure 1:
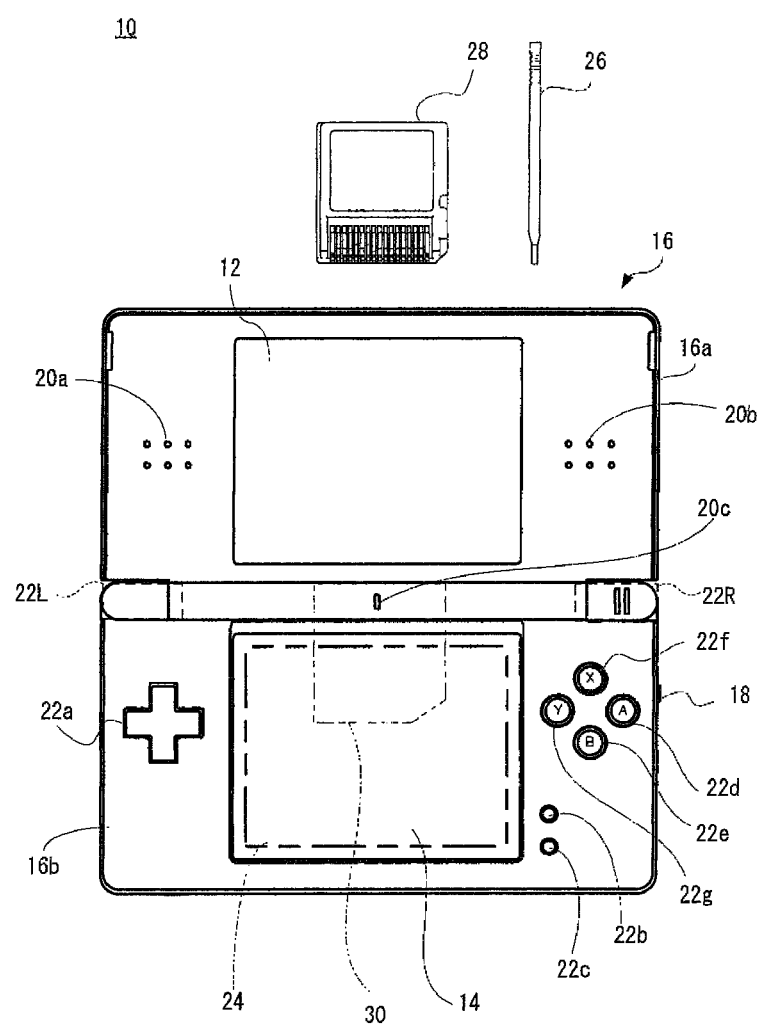
FIG. 1 is an external view showing a game apparatus to which one embodiment of the present invention is applied.

Referring to FIG. 1, a game apparatus 10 of this invention is implemented in the form of a hand-held typed game apparatus, as one example. However, the form of the game apparatus 10 is arbitrary, and may be a console typed game apparatus, a personal computer, a mobile information terminal, a cellular phone, etc.

The game apparatus 10 includes a first liquid crystal display (LCD) 12 and a second LCD 14. The LCD 12 and the LCD 14 are set on a housing 16 so as to be arranged in predetermined positions. In this embodiment, the housing 16 is composed of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape and a size approximately the same as those of the upper housing 16a, and has an opening formed so as to expose a display surface of the LCD 14 at an approximately center of the horizontal direction. Also, a power switch 18 is provided on the right side face of the lower housing 16b.

Furthermore, the upper housing 16a is provided with sound release holes 20a and 20b for speakers 36a and 36b (see FIG. 2) on both sides of the LCD 12.

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

Then, a microphone hole 20c for a microphone 60 (see FIG. 2) is formed at the center of the connected portion between the upper housing 16a and the lower housing 16b.

This makes it possible to perform game processing on the basis of a sound signal by a sound, a voice or a breath taken from the microphone 60.

Furthermore, the lower housing 16b is provided with an operating switch 22 (22a, 22b, 22c, 22d, 22e, 22L and 22R).

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16b. The other switches 22b-22g are arranged at the right of the LCD 14 on the one surface of the lower housing 16b. In addition, the operating switches 22L and 22R are arranged at the right and left corners on the upper side face of the lower housing 16b. It should be noted that action switches 22L and 22R are provided on a back face of the lower housing 16b, and shown by dotted line because they are hidden under the connected portion in a front view as shown in FIG. 1.

The direction instructing switch 22a functions as a digital joystick, and is utilized for instructing a traveling direction (moving direction) of a player object (or player character) to be operated by a user or a player and instructing a traveling direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player object to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be used for the similar operations to the A button 22d and B button 22e. Of course, the X button 22f and the Y button 22g are not necessarily utilized in the game play.

The action switch (left depression button) 22L and the action switch (right depression button) 22R are formed by the push buttons, and the left depression button. (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles.

Also, on a top surface of the LCD 14, a touch panel 24 is provided. As the touch panel 24, any kinds of a resistance film system, an optical system (infrared rays system) and an electrostatic capacitive coupling system, for example, can be utilized. The touch panel 24 is a pointing device for designating an arbitrary position within the screen of the LCD 14 by the user. In response to an operation (touch input) by depressing, stroking, touching, and so forth with a stick 26, a pen (stylus pen), or a finger (hereinafter, referred to as "stick 26 or the like") on a top surface of the touch panel 24, the touch panel 24 detects coordinates of an operated position by the stick 26 or the like to output coordinates data corresponding to the detected coordinates.

Additionally, in this embodiment, a resolution of the display surface of the LCD 14 (the same is true for the LCD 12) is 256 dots×192 dots. A detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, a map, characters such as, a player object, etc. are displayed on the one LCD, and items belonging to the player object may be displayed on the other LCD. Additionally, a game screen including a player object and a non-player object, etc. may be displayed on the one LCD, and a game screen including information relating to the player object and the non-player object or an operation screen for operating the player object can be displayed on the other LCD. Alternatively, by utilizing the two LCD 12 and LCD 14 as one screen, it is possible to display a large monster (enemy object) to be defeated by the player object.

Accordingly, the player is able to point (operate) an image, such as a player object, an enemy object, an item object, an operating object, etc. to be displayed on the screen of the LCD 14 and select (input) commands by operating the touch panel 24 with the use of the stick 26 or the like. Also, it is possible to change an orientation of a virtual camera (viewpoint) (direction of the line of sight) provided in the virtual game space (three-dimensional game space), and instruct a scrolling (gradual moving display) direction of the game screen (map).

Additionally, depending on the kind of the game, other input instructions can be made with the use of the touch panel 24. For example, it is possible to input by hand texts, numbers, symbols, etc. on the LCD 14 of the touch panel 24.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two kinds.

Although the first LCD 12 and the second LCD 14 are vertically arranged in this embodiment, the arrangement of the two LCDs may be changed as necessary. In another embodiment, the first LCD 12 and the second LCD 14 may be horizontally arranged.

Furthermore, in this embodiment, two LCDs are provided, but the number of LCDs as a displaying means can be changed as necessary. In another embodiment, one vertically-long LCD is provided, and by vertically dividing the display areas into two, two game screens may be displayed on the respective display areas, or one horizontally-long LCD is provided, and by horizontally dividing the display area side by side, two game screens may be displayed on the respective display areas.

In addition, the stick 26 can be housed in the housing portion (not shown) provided on the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on a back face of the lower housing 16b. Although omitted in FIG. 1, a connector 32 (see FIG. 2) is provided at a depth portion of the loading slot 30 for connecting a connector provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

Furthermore although omitted in FIG. 1, a battery accommodating box is provided on a bottom face of the lower housing 16b, a volume switch, an earphone jack, etc. are provided on the front face of the lower housing 16b, and an external expansion connector is provided on the back face, for example.

Figure 2:
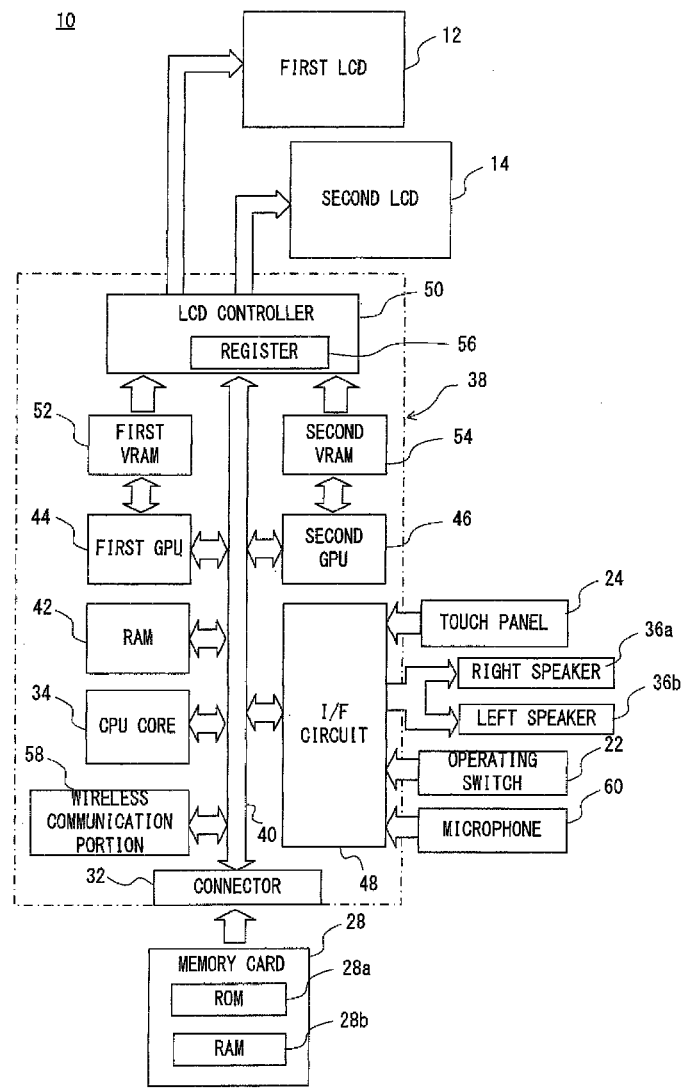
FIG. 2 is a block diagram showing one example of an electric configuration of the game apparatus.

FIG. 2 is a block diagram showing an electrical configuration of the game apparatus 10. Referring to FIG. 2, the game apparatus 10 includes an electronic circuit board 38, and on the electronic circuit board 38, circuit components, such as the CPU core 34, etc. are mounted. The CPU core 34 is connected to the above-described connector 32 via a bus 40, and is connected with a RAM 42, a first graphics processing unit (GPU) 44, a second GPU 46, an input-output interface circuit (hereinafter, referred to as "I/F circuit") 48, an LCD controller 50, and a wireless communication portion 58.

The connector 32 is detachably connected with the memory card 28 as described above. The memory card 28 includes a ROM 28a and a RAM 28b, and although illustration is omitted, the ROM 28a and the RAM 28b are connected with each other via a bus, and also connected with a connector (not shown) to be connected with the connector 32. Accordingly, the CPU core 34 gains access to the ROM 28a and the RAM 28b as described above.

The ROM 28a stores in advance a game program for a game to be executed by the game apparatus 10, image data (text and object image, background image, item image, icon (button) image, message image, etc.), data of the sound (music) necessary for the game (sound data), etc. The RAM (backup RAM) 28b stores (saves) proceeding data of the game, result data of the game, etc. A flash memory, or the like may be executed as a memory for save.

The RAM 42 is utilized as a buffer memory or a working memory. That is, the CPU core 34 loads the game program, the image data, the sound data, etc. stored in the ROM 28a of the memory card 28 into the RAM 42, and executes the processing according to the loaded game program. The CPU core 34 executes a game processing while storing data (game data, flag data, etc.) generated or obtained in correspondence with a progress of the game in the RAM 42.

It should be noted that the game program, the image data, the sound data, etc. are stored (loaded) from the ROM 28a entirely at a time, or partially and sequentially so as to be stored into the RAM 42.

Here, applications other than the game may be executed in the game apparatus 10, and in this case, in the ROM 28a of the memory card 28, necessary data, such as programs and image data relative to the application may be stored. Furthermore, sound (music) data may be stored as necessary.

Each of the GPU 44 and the GPU 46 forms a part of a rendering means, is constructed by, for example, a single chip ASIC, and receives a graphics command (rendering command) from the CPU core 34 to generate image data according to the graphics command. Additionally, the CPU core 34 applies an image generation program (included in the game program) required to generate the image data to both of the GPU 44 and GPU 46 in addition to the graphics command.

Furthermore, the CPU 44 is connected with a first video RAM (hereinafter referred to as "VRAM") 52, and the GPU 46 is connected with a second VRAM 54. The GPU 44 and the CPU 46 respectively access the first VRAM 52 and the second VRAM 54 to obtain data (image data: polygon data, texture data, etc.) required to execute the rendering command.

Here, the CPU core 34 writes image data necessary for rendering to the first VRAM 52 and the second VRAM 54 via the GPU 44 and the GPU 46. The GPU 44 accesses the VRAM 52 to produce image data for rendering, and stores the image data in a rendering buffer of the VRAM 52. The CPU 46 accesses the VRAM 54 to produce image data for rendering, and stores the image data in a rendering buffer of the VRAM 54. As a rendering buffer, a frame buffer, a line buffer or the like may be adopted.

The VRAM 52 and the VRAM 54 are connected to the LCD controller 50. The LCD controller 50 includes a register 56, and the register 56 consists of, for example, one bit, and stores a value of "0" or "1" (data value) according to an instruction from the CPU core 34. The LCD controller 50 outputs the image data produced by the GPU 44 to the LCD 12, and outputs the image data produced by the GPU 46 to the LCD 14 in a case that the data value of the register 56 is "0". Additionally, the LCD controller 50 outputs the image data produced by the GPU 44 to the LCD 14, and outputs the image data produced by the CPU 46 to the LCD 12 in a case that the data value of the register 56 is "1".

Here, the LCD controller 50 can directly read the image data from the VRAM 52 and the VRAM 54, or read the image data from the VRAM 52 and the VRAM 54 via the GPU 44 and the GPU 46, respectively.

Furthermore, the VRAM 52 and the VRAM 54 may be provided to the RAM 42, or the rendering buffer and the Z buffer may be provided to the RAM 42.

The I/F circuit 48 is connected with the operating switch 22, the touch panel 24, the speakers 36a, 36b, and a microphone 60. The operating switch 22, here, is the above-described switches 22a, 22b, 22c, 22d, 22e, 22f, 22g, 22L and 22R. When the operating switch 22 is operated, a corresponding operation signal (operation data) is input to the CPU core 34 via the I/F circuit 48. Furthermore, coordinates data output from the touch panel 24 is input to the CPU core 34 via the I/F circuit 48. In addition, the CPU core 34 reads from the RAM 42 the sound data necessary for the game, such as a game music (BGM), a sound effect or voices of a game character (onomatopoeic sound), etc., and outputs the same from the speakers 36a, 36b via the I/F circuit 48. A sound (sound signal) input from the microphone 60 is converted into digital data (sound data) in the I/F circuit 48, and input to the CPU core 34. The CPU core 34 can execute game processing according to the sound input, and change the game image displayed oil the LCD 12 and/or LCD 14.

The wireless communication portion 58 is a communication means for transmitting and receiving data with another game apparatus 10 or communications equipment in a wireless manner. Here, a weak radio wave transmitted and received by the game apparatus 10 is set in intensity to such a degree as not to be restricted by the Radio Law. When the CPU core 34 applies data such as game data, a command, etc. to the wireless communication portion 58, the wireless communication portion 58 modulates communication data to be transmitted to the opponent into a wireless signal and transmits it from an antenna. Furthermore, the wireless communication portion 58 receives a wireless signal from the opponent by the antenna to demodulate it to data, and applies the data to the CPU core 34. Via the wireless communication portion 58, the game apparatus 10 receives and transmits data with another game apparatus 10 to thereby execute a communication game. The game apparatus 10 can connect to a network via the wireless communication portion 58, and thus can download a program and data from a server on the network and communicate with another game apparatus 10 via the network.

The game apparatus 10 configured as described above can be used as a sound recording apparatus (voice recorder). First, the outline is explained. When a recording start operation is performed by the operating switch 22, the CPU core 34 starts processing of converting an input sound from the microphone 60 into digital data in the I/F circuit 48 and temporarily storing the same in the RAM 42. The temporary storing processing is ended when a stop operation by the operating switch 22 is performed, or when a maximum recording time (10 seconds in this embodiment) set in advance elapses.

Figure 3:
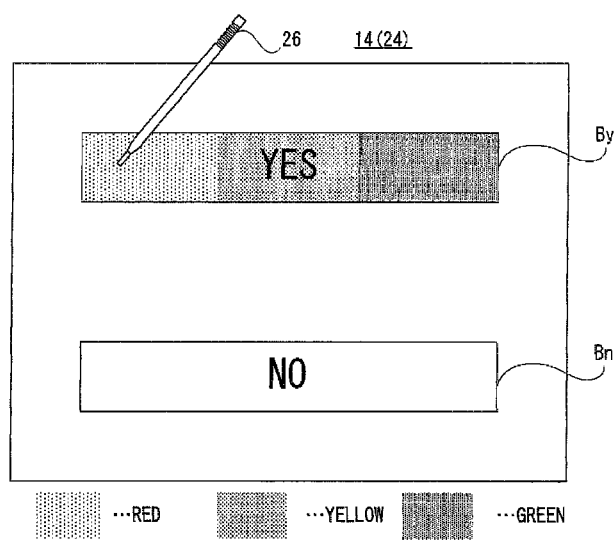
FIG. 3 is an illustrative view showing a display example of buttons.

The CPU core 34 then displays an operation screen shown in FIG. 3 on the LCD 14, to inquire the user whether or not the temporarily stored sound is to be saved. Referring to FIG. 3, the operation screen includes a "Yes" button By to which an allowance-denoting command is assigned and a "NO" button Bn to which a rejection-denoting command is assigned.

The inside of the "Yes" button By is painted by three colors, red, yellow and green. For example, when an area painted in read within the "Yes" button By is touched with the stick 26, or the like (hereinafter, a touching operation with the stick 26 or the like may be called a "button push"), the CPU core 34 assigns an identifier and a color code indicating "red" to the temporarily stored sound, and saves the same. When the "NO" button Bn is pushed, the CPU core 34 discards the temporarily stored sound (or makes it rewritable). Here, in this embodiment, a serial number 1, 2, . . . indicating how many sounds precedes before this sound is used as an identifier. The color code is represented by a combination of three values, such as R (red), G (green) and B (blue).

Figure 4:
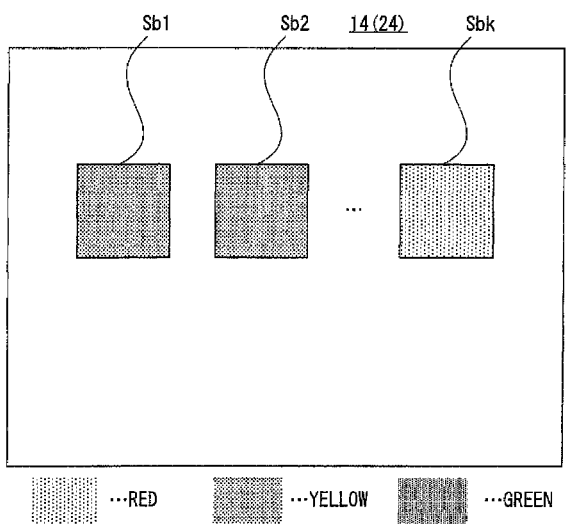
FIG. 4 is an illustrative view showing a display example of symbols.

Assuming that such sound recording is performed k times (k is one or more integer), and sound 1 to k are saved in the RAM 42 at this point. When a list displaying operation is performed with the operating switch 22, the CPU core 34 displays a list screen shown in FIG. 4 on the LCD 14. Referring to FIG. 4, the list screen includes symbols Sb1-Sbk which respectively correspond to the stored sounds 1-k. The symbols Sb1-Sbk are displayed according to the color codes assigned to corresponding sounds 1-k. When the user pushes any one of the symbols Sb1-Sbk, the CPU core 34 detects this through the touch panel 24, and reproduces a corresponding sound.

Accordingly, by pushing the area painted in a desired color when the "Yes" button By is pushed, the user can allow save of a sound "k", and set a display color of the symbol Sbk. That is, since a command input and a condition setting (or an attribute value setting, a subcommand input associated with the command, etc.) associated thereto can be performed with mere one button operation, it is possible to improve the operability. The detail is explained below.

Figure 5:
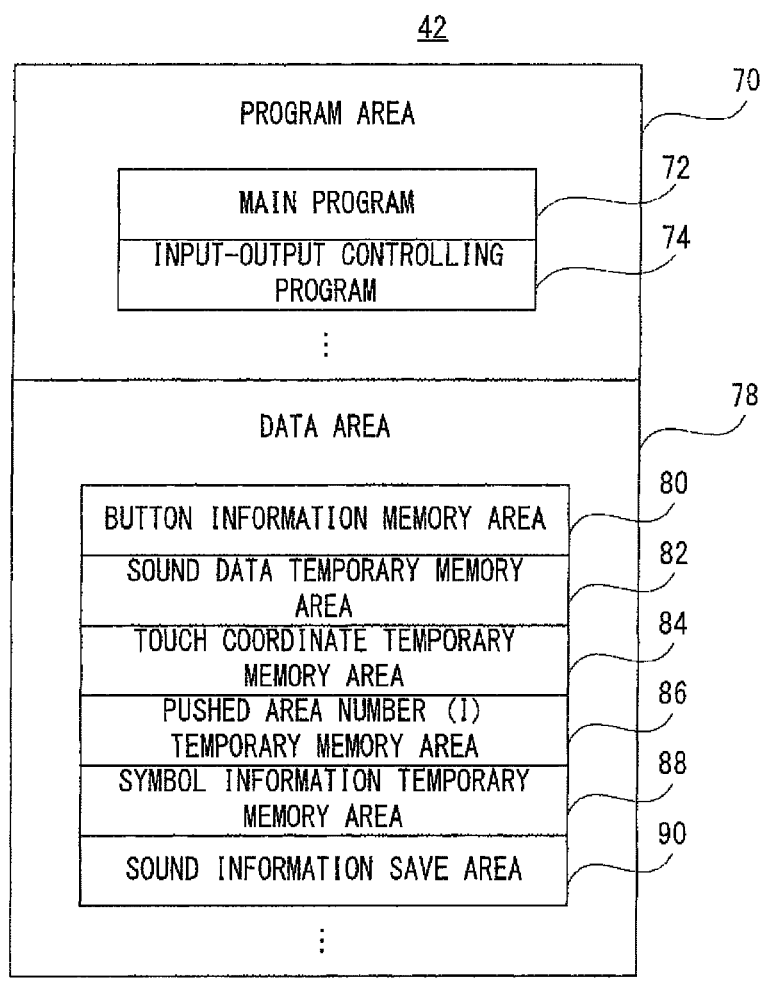
FIG. 5 is an illustrative view showing one example of a memory map.

FIG. 5 shows a memory map of the RAM 42 when a sound recording is performed in the game apparatus 10. Referring to FIG. 5, the CAM 42 is formed with a program area 70 and a data area 78, and the program area 70 stores a main program 72 for recording a sound by controlling the entire apparatus, and an input-output controlling program 74 for mainly inputting and outputting a command, a sound, and a video by controlling the I/F circuit 48.

The data area 78 includes a button information memory area 80, a sound data temporary memory area 82, a touch coordinate temporary memory area 84, a pushed area number (I) temporary memory area 86, a symbol information temporary memory area 88, a sound information save area 90, etc. In the button information memory area 80, button information (FIG. 6: described later) for displaying the "Yes" button By and the "NO" button Bn shown in FIG. 3 is stored. The sound data temporary memory area 82 is an area for temporarily storing sound data input from the microphone 60, and the touch coordinate temporary memory area 84 is an area for temporarily storing touched coordinates detected via the touch panel 24.

The pushed area number (I) temporary memory area 86 is an area for temporarily storing a number I indicating which area out of three areas E1-E3 (FIG. 8: described later) within the button By is pushed when the "Yes" button By is pushed, and the symbol information temporary memory area 88 is an area for temporarily storing symbol information like a color code assigned to the pushed area, and the sound information save area 90 is an area for saving temporarily-stored-sound data and temporarily stored symbol information as sound information.

Figure 6:
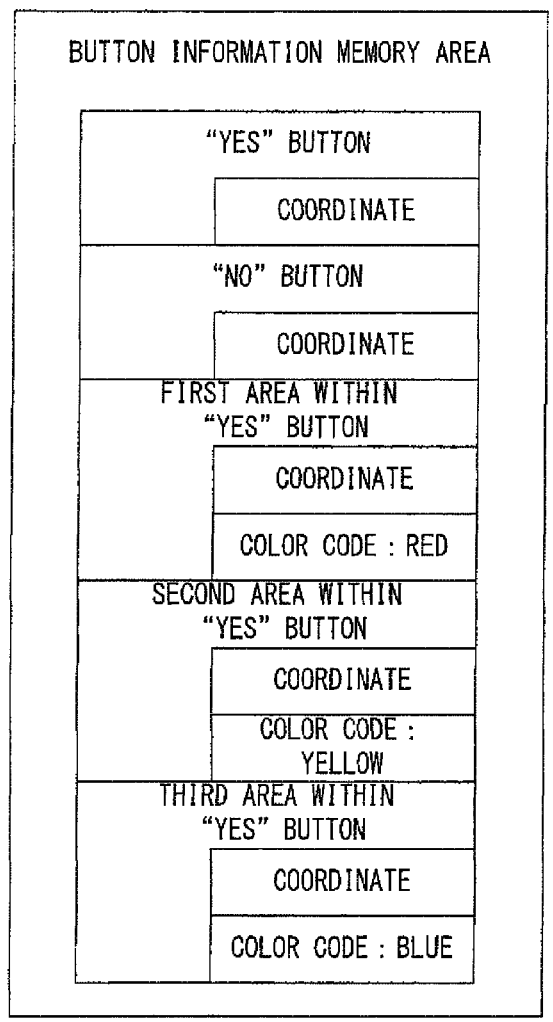
FIG. 6 is an illustrative view representing button information corresponding to a button.

The button information is so-called a set of commands for displaying the buttons shown in FIG. 3, and constituted as shown in FIG. 6, for example. Referring to FIG. 6, the button information includes coordinates of the "Yes" button By, coordinates of the "NO" button Bn, coordinates of the first area E1 within the "Yes" button By, a color code assigned thereto, coordinates of the second area E2 within the "Yes" button By, a color code assigned thereto, coordinates of the third area within the "Yes" button By, and a color code assigned thereto.

Figure 7:
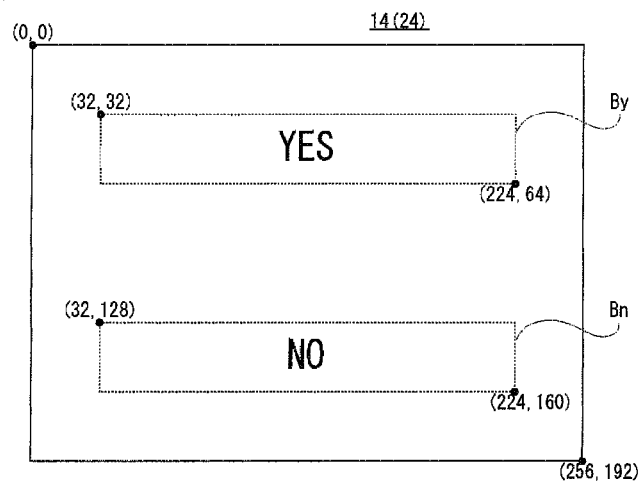
FIG. 7 is an illustrative view showing coordinates of buttons.
Figure 8:
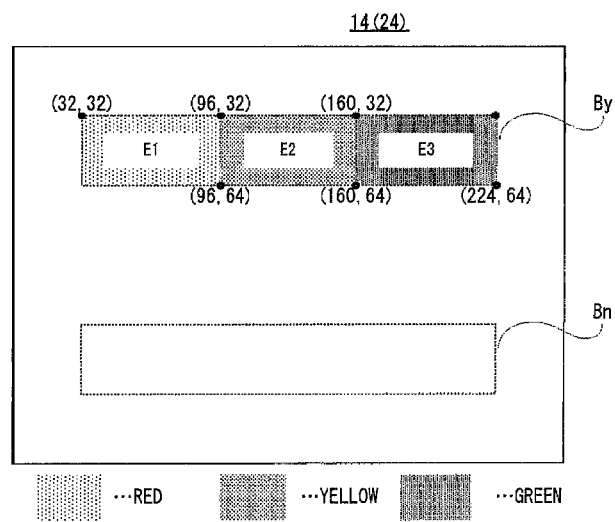
FIG. 8 is an illustrative view showing coordinates of each area and a color code which are assigned to each button.

One example of the coordinates of the buttons By, Bn is shown in FIG. 7, and one example of tee coordinates of the areas E1-E3 and the color codes is shown in FIG. 8. Here, a coordinate system in which an upper left corner of the screen of the LCD 14 (and detection surface provided to the touch panel 24) is (0, 0), and a lower right corner is (256, 192) is adopted. Referring to FIG. 7, the coordinates of the "Yes" button By are described as (32, 32)-(224, 64), and the coordinates of the "NO" button Bn are described as (32, 128)-(224, 160). Referring to FIG. 8, the coordinates of the area E1 are described as (32, 32)-(96, 64), and the coordinates of the area E2 are described as (96, 32)-(160, 64), and the coordinates of the area E3 are described as (160, 32)-(224, 64). Then, the areas E1, E2 and E3 are respectively assigned "red", "yellow" and "green" as a color code.

Figure 9:
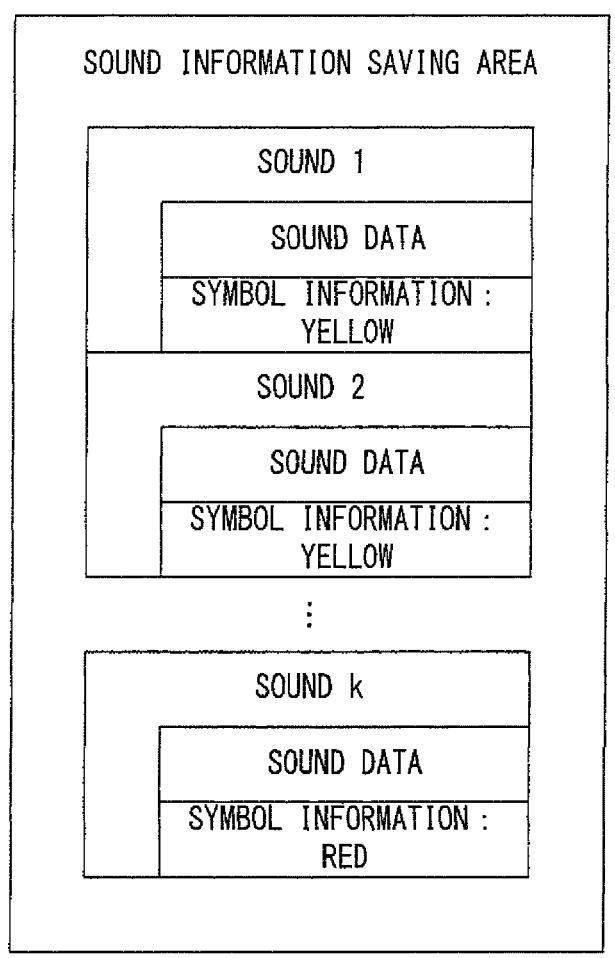
FIG. 9 is an illustrative view slowing one example of sound information.

FIG. 9 shows one example of a saving format of sound information. Referring to FIG. 9, each sound 1, 2, . . . includes sound data and symbol information. The symbol information is information indicating a display manner of each symbol Sb1-Sbk, and as a display manner, a color code representing a display color in this embodiment is described.

Figure 10:
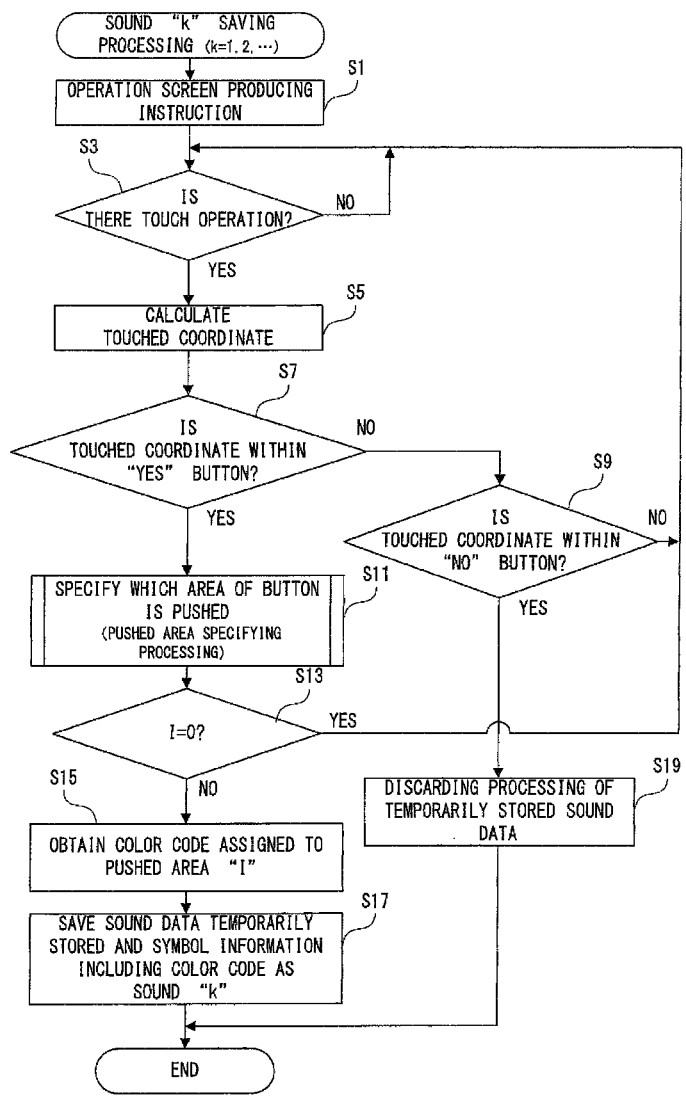
FIG. 10 is a flowchart showing a part of an operation by a CPU.

When saving a sound "k" (k—1, 2, . . . ), the CPU core 34 executes a flowchart according to FIG. 10. The flowchart in FIG. 10 (and FIG. 11, FIG. 12 described later) corresponds to a part of the main program 72 (FIG. 5).

In a step S1, the CPU core 34 informs the GPU 46 of button information (FIG. 6) stored in the button information memory area 80 of the RAM 42 to produce an image of an operation screen. The GPU 46 produces the image on the basis of the informed button information, and outputs the acquired image data to the LCD 14 via the LCD controller 50. Thus, the operation screen as shown in FIG. 3 is displayed on the LCD 14.

The CPU core 34 then determines whether or not there is a touch operation on the basis of a signal from the touch panel 24 in a step S3, and when a touch operation is detected, the process shifts to a step S5 to calculate touched coordinate. Then, in a step S7, it is determined whether or not the calculated touched coordinate is within the "Yes" button By on the basis of the button information. If "NO" here, it is further determined whether or not the touched coordinate is within the "NO" button Bn in a step S9. If "NO" is determined here as well, it is determined that a place other than the button is touched, and therefore, the process returns to the step S3.

Figure 11:
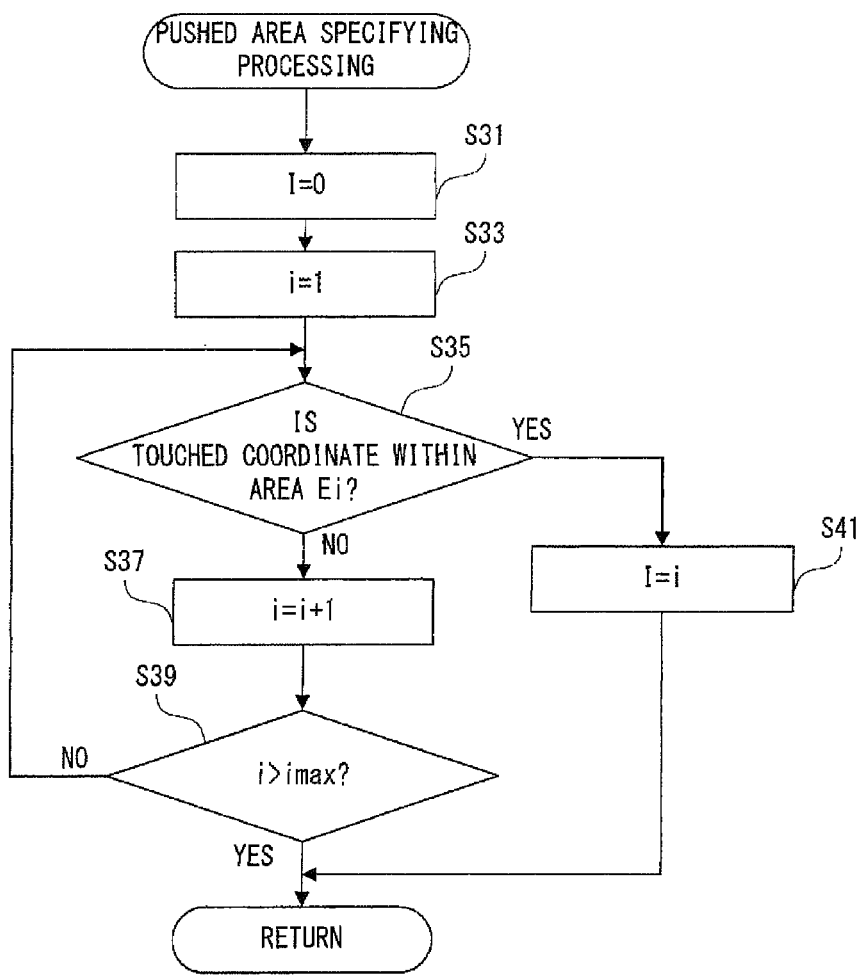
FIG. 11 is a flowchart showing another part of the operation by the CPU.

If "YES" in the step S7, which area within the "Yes" button By is pushed is specified in a step S11. The pushed area specifying processing is executed according to the flowchart shown in FIG. 11. Referring to FIG. 11, the CPU core 34 first sets "0" in a variable I in a step S31, and sets "1" to a variable i in a step S33, and then, the process proceeds to a step S35 to determine whether or not the touched coordinate calculated in the step S5 is within the i-th area, that is, the area Ei of the "Yes" button By on the basis of the button information (FIG. 6).

If "NO" in the step S35, the variable i is incremented in a step S37, and it is determined whether or not the variable i is above a constant imax ("3" here) in a step S39. If "NO" here, the process returns to the step S35. If "YES" in the step S39, it is considered that a position not belonging to the areas E1-Eimax is pushed (noted that the areas E1-E3 are closely assigned to the "Yes" button By (FIG. 8) in this embodiment, but they may be loosely assigned: FIG. 13(C)), and then, the CPU core 34 restores to the processing of the routine at the hierarchical upper level. In this case, a step S13 in FIG. 10 is executed in a state of I=0.

If "YES" in the step S35, the process returns to the routine at the hierarchical upper level through a step S41. In the step S41, the value of the variable i is set to the variable I. In this case, the step S13 in FIG. 10 is executed in a state of I=i (I=1 in FIG. 3 example).

Returning to FIG. 10, the CPU core 34 determines whether or not the variable I is "0" in the step S13, and if "YES", the process returns to the step S3. If "NO" in the step S13, the process shifts to a step S15 to obtain a color code ("red" in FIG. 3 example) assigned to the pushed area "I" from the button information memory area 80 (FIG. 6). Then, in a step S17, the sound data temporarily stored in the sound data temporary memory area 82 (FIG. 5) and the symbol information including the color code obtained in the step S15 are saved in the sound information save area 90 as a sound "k" (FIG. 9). After the saving, the process is ended.

If "YES" in the step S9, the CPU core 34 discards the sound data temporarily stored in the sound data temporary memory area 82 in a step S19 (or makes it rewritable), and ends the processing.

Alternatively, if "YES" in the step S13, that is, if I=0, the sound data is saved without returning to the step S3 (that is, without adding the symbol information, such as a color code, etc.), and then, the process may be ended. Or, the default symbol information (white, achroma, etc.) may be added to the sound data, and then, the process may be ended.

Figure 12:
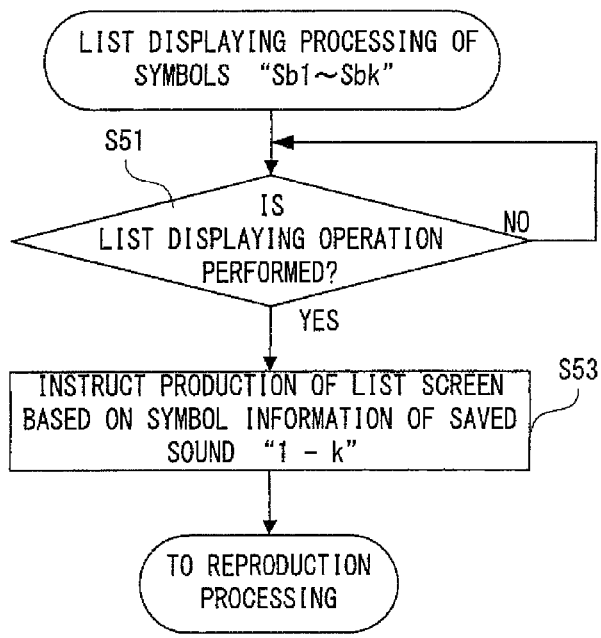
FIG. 12 is a flowchart showing a still another part of the operation by the CPU.

Furthermore, when displaying a list screen as shown in FIG. 4 on the LCD 14, the CPU core 34 executes processing according to a flowchart in FIG. 12. In a step S51, it is determined whether or not a list displaying operation is performed with the operating switch 22, and if "YES", the process shifts to a step S53 to display the list screen including the symbols Sb1, Sb2, ... on the basis of the symbol information saved in the sound information save area 90. Then, reproduction processing (not illustrated) utilizing the list screen is executed.

Here, in this embodiment, the "Yes" button By is painted in three colors (displayed in three colors), but this may be displayed by two colors or four colors or more. As one example, the "Yes" button By displayed by four colors is shown in FIG. 13(A). In the modified example, 2 horizontal×2 vertical of four areas (E1-E4) are assigned to the "Yes" button By. As another example, the "Yes" button By displayed in 256 colors is shown in FIG. 13(B). In the modified example, horizontal 256×vertical 1 of 256 areas (E1-E256) are assigned to the "Yes" button By, and the color of the "Yes" button By is displayed by gradations (smoothly changed). Alternatively, the "Yes" button By may has uneven coating as shown in FIG. 13(C) (there may be a space between the areas E1-E3 shown in FIG. 8).

Alternatively, in FIG. 13(B), 256 areas may be arranged in a two-dimensional manner like horizontal 32×vertical 8, and in this case, the gradations also become a two dimensional manner (not illustrated). The change in color here includes a case that only the brightness is changed in a monochrome image, and only a color tone in the single hue is changed. Furthermore, one assigned to each area may be design (pattern), such as mesh, grid, etc. beyond colors.

Furthermore, with respect to the button information (FIG. 6) in this embodiment, the coordinates and the color code as to each area within the "Yes" button By are described, a function defining a relation between the coordinates and the color code within the "Yes" button By may be taken. One example of the button information including such a function is displayed in FIG. 14. In the modified example, the CPU core 34 specifies a color code corresponding to the touched coordinate by utilizing the function. This makes it possible to reduce the information amount of the button information and a load on the processing especially when there are many areas as shown in FIG. 3(B). For example, one-dimensional gradations shown in FIG. 13(B) is described in a linear function taking the touched coordinate as (x, y), more simply, like "C=k*x+C0 (here, C is a color code, x is an x coordinate of a touched point, k is a constant indicating a slope, and C0 is a constant indicting an offset)". In a case of the two-dimensional gradations, C is a function of x and y like "C=k1*x+k2*y+C0, for example. A two-dimensional or more functions and circular functions may be utilized. Or, in place of the function, a color palette arranged with color codes is prepared in an x-y plane, and the color code corresponding to a touched coordinate (x, y) may be obtained from it.

In addition, a sound code may be assigned to each area in place of or in addition to the color code. When any one of the symbols is pushed on the list screen, a sound effect according to the sound code is output.

Furthermore, the saved data may be image data, text data beyond the sound data.

As understood from the above description, in this embodiment, the CPU core 34 displays the "Yes" button By to which a command of allowing save of the temporarily-stored sound "k" data (k=1, 2 ...) is assigned on the LCD 14 (S1), specifies which position within the displayed button is designated via the touch panel 24 provided on the LCD 14 when a designating operation of an arbitrary position within the displayed button By is performed with the stick 26 or the like (S11), sets a condition to the command on the basis of the specified position (S15), and executes the information processing in relation to the command according to the set condition (S17, S53).

The condition, here, is symbol information describing which color the symbol Sbk corresponding to the sound "k" data is to be displayed, and the CPU core 34 executes saving processing of adding the set condition to the sound "k" data and then saving the same as information processing in associated with the command (S17). When a list displaying operation is performed thereafter, the CPU core 34 executes the list displaying processing for displaying the saved symbols Sb1-Sbk on the LCD 14 as another information processing in associated with the command (S53).

Accordingly, the user can perform a command input and a condition setting with one operation, capable of improving the operability of the information processing apparatus.

In addition, in the above described embodiment (first embodiment), each symbol Sb1, Sb2, . . . is displayed in any one of the plurality of colors on the list screen (FIG. 4), but it may be displayed by any one of a plurality of sizes, or may be displayed by any one of a plurality of shapes. Or, an area of the colored part may be changed in each symbol Sb1, Sb2, . . . . Moreover, a display is made according to a combination of two or more of a plurality of parameters, such as color, size, shape, and colored area. Thereupon, FIG. 15-FIG. 19 explain as a second embodiment a case that color, shape and colored area are changed.

Figure 15:
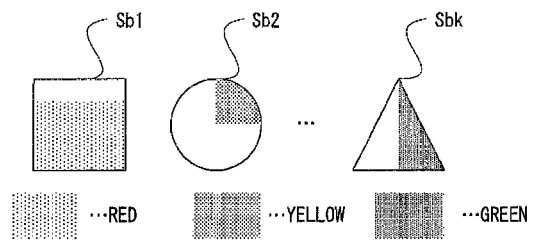
FIG. 15 is all illustrative view showing symbols in another embodiment.

Referring to FIG. 15, the symbol Sb1 has a quadrangle shape, and is colored in red, and a ratio of the colored part is 75%. The symbol Sb2 has a circle shape, is colored in yellow, and a ratio of the colored part is 25%. The symbol Sbk has a triangle shape, is colored in green, and a ratio of the colored part is 50%. The difference in color is based on a user's selection while the difference in shape is based on the kind of the effect applied to the sound data, and the difference in colored ratio is based on the length of a recording time. The colored ratio is calculated as a ratio of a recording time to a maximum recording time (10 seconds). If the recording time of a certain sound is 5 seconds, the colored ratio of the symbol corresponding to the sound is calculated as 5/10–0.5(=50%).

Figure 16:
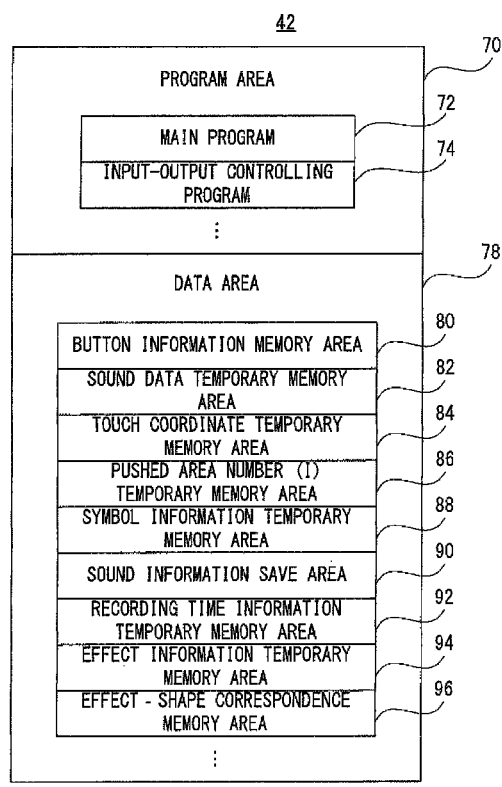
FIG. 16 is an illustrative view showing a memory map in FIG. 15 embodiment.

Referring to FIG. 16, this memory map is a memory map obtained by adding a recording time information temporary memory area 92, an effect information temporary memory area 94, and an effect-shape correspondance table memory area 96 to that of the first embodiment (FIG. 5). The recording time information temporary memory area 92 is an area for storing information indicating a recording time of sound data temporarily stored in the sound data temporary memory area 82, and the effect information temporary memory area 94 is an area for storing information indicating the kind of the effect (effects 1, 2, 3, for example) temporarily stored in the sound data temporary memory area 82. Then, the effect-shape correspondance table memory area 96 stores an effect-shape correspondence table shown in FIG. 17. According to the correspondence table, the effects 1, 2 and 3 respectively correspond to a quadrangle, a circle and a triangle.

Referring to FIG. 18, the sound information is configured similar to that of the first embodiment (FIG. 9), but the symbol information further includes a shape code and colored ratio data in addition to the color code.

Figure 19:
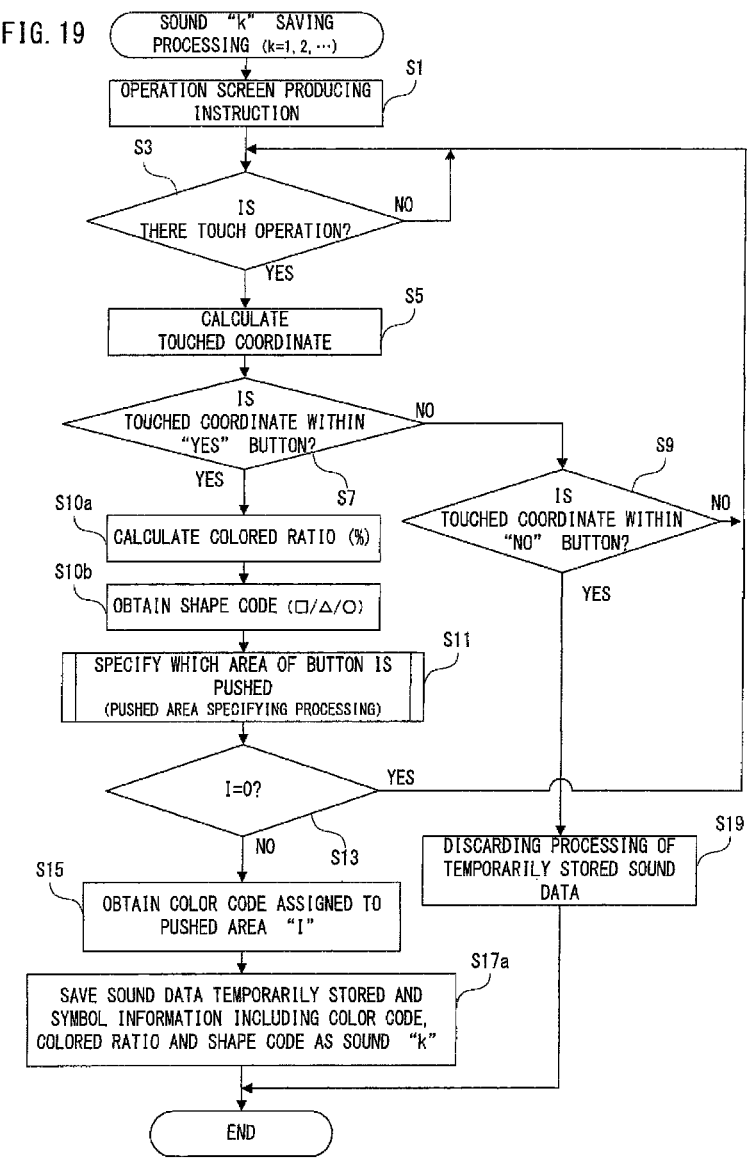
FIG. 19 is an illustrative view showing a part of an operation by the CPU in FIG. 15 embodiment.

Referring to FIG. 19, the sound "k" saving processing is processing of adding steps S10a and S10b directly after the step S7: YES and replacing the step S17 with a step S17a in the processing of the first embodiment (FIG. 10). In the step S10a, the CPU core 34 calculates a colored ratio (%) on the basis of the information stored in the recording time information temporary memory area 92 (FIG. 16). In the step S10b, the CPU core 34 obtains a shape code corresponding to the information stored in the effect information temporary memory area 94 from the correspondence table (FIG. 17) stored in the effect-shape correspondance table memory area 96. In the step S17a, the sound data temporarily stored in the sound data temporary memory area 82 and the symbol information including the colored ratio calculated in the step S10a, the shape code obtained in the step S10b and the color code obtained in the step S15 are saved in the sound information save area 90 (FIG. 18) as a sound "k".

Additionally, in the second embodiment, out of the three parameters for symbol display, that is, color, shape and colored ratio, only the color is decided according to a user's selection, but the color and the shape may be made selectable. Thereupon, as a third embodiment, a case that merely one push of the "Yes" button By allows the color and the shape to be selectable is shown in FIG. 20-FIG. 23.

Figure 20:
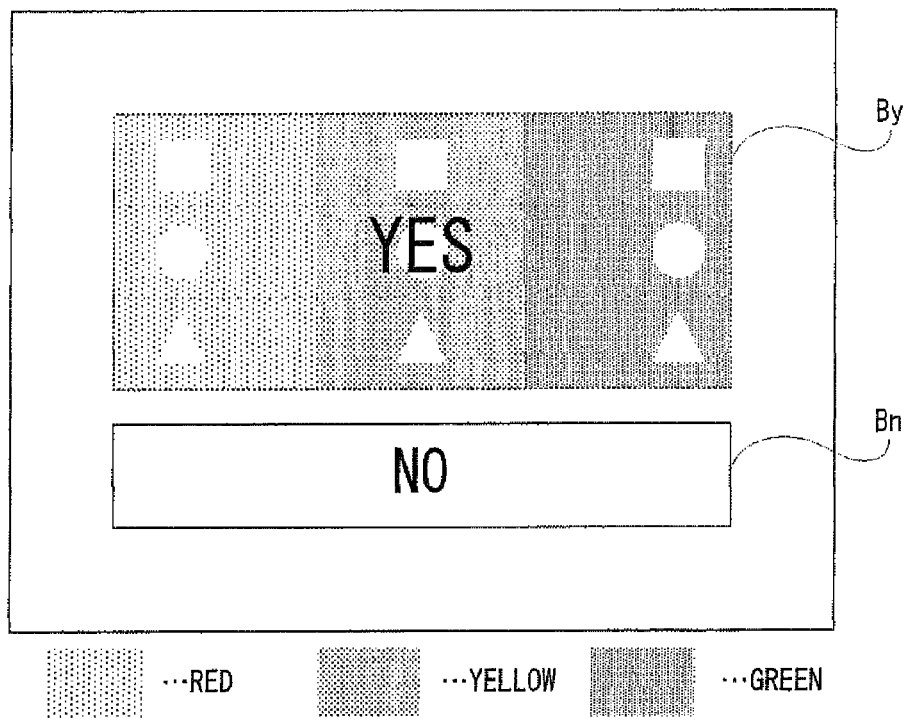
FIG. 20 is an illustrative view showing a display example of buttons in another embodiment.
Figure 21:
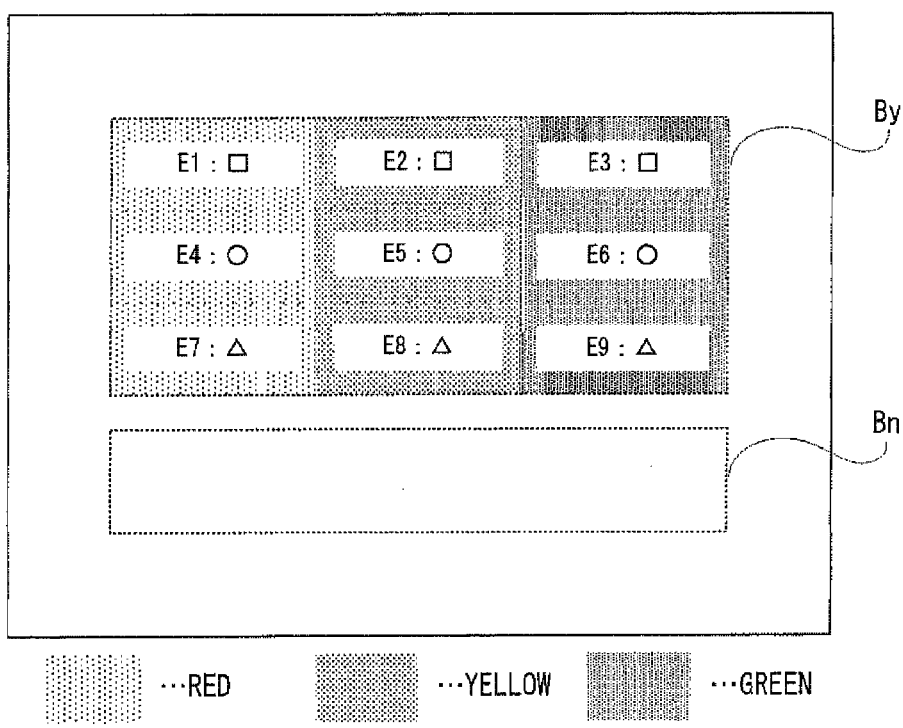
FIG. 21 is an illustrative view showing areas assigned to the buttons in FIG. 20.

One example of the "Yes" button By capable of selecting any one of the three colors such as red, yellow and green and any one of the three shapes such as a quadrangle, a circle and a triangle with one operation is shown in FIG. 20. Since the combination between the color and the shape is 3×3=9, areas E1-E9 of 3×3=9 are assigned to the "Yes" button By as shown in FIG. 21.

These nine combinations may be assigned to any areas E1-E9, but an array in which buttons in the same shape are arranged in a lateral direction, and buttons with the same color are arranged in a longitudinal direction is adopted. In displaying, as shown in FIG. 20, the button is painted in different color for each area, and shapes, such as a quadrangle, a circle, etc. are decolorized. On the contrary thereto, each area is painted in white, and quadrangles and circles may be colored.

Figure 22:
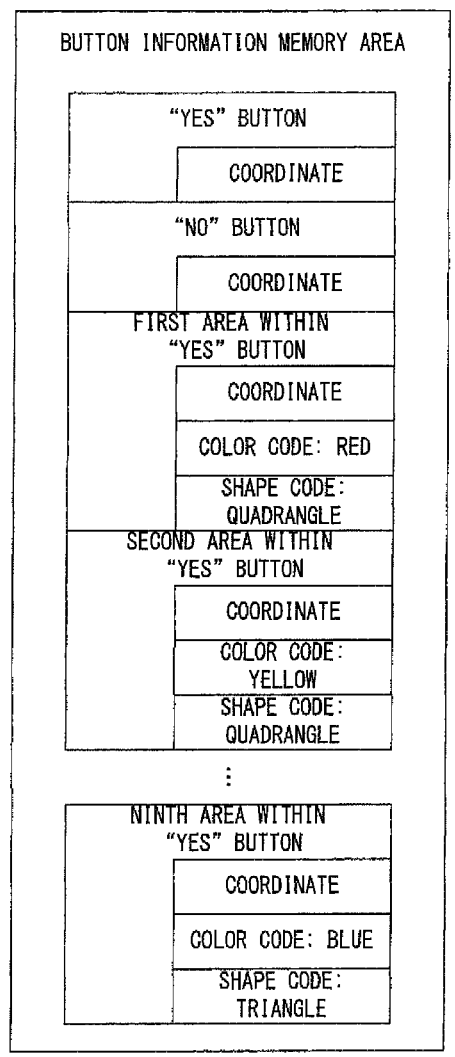
FIG. 22 is an illustrative view showing button information corresponding to the buttons in FIG. 20.
Figure 23:
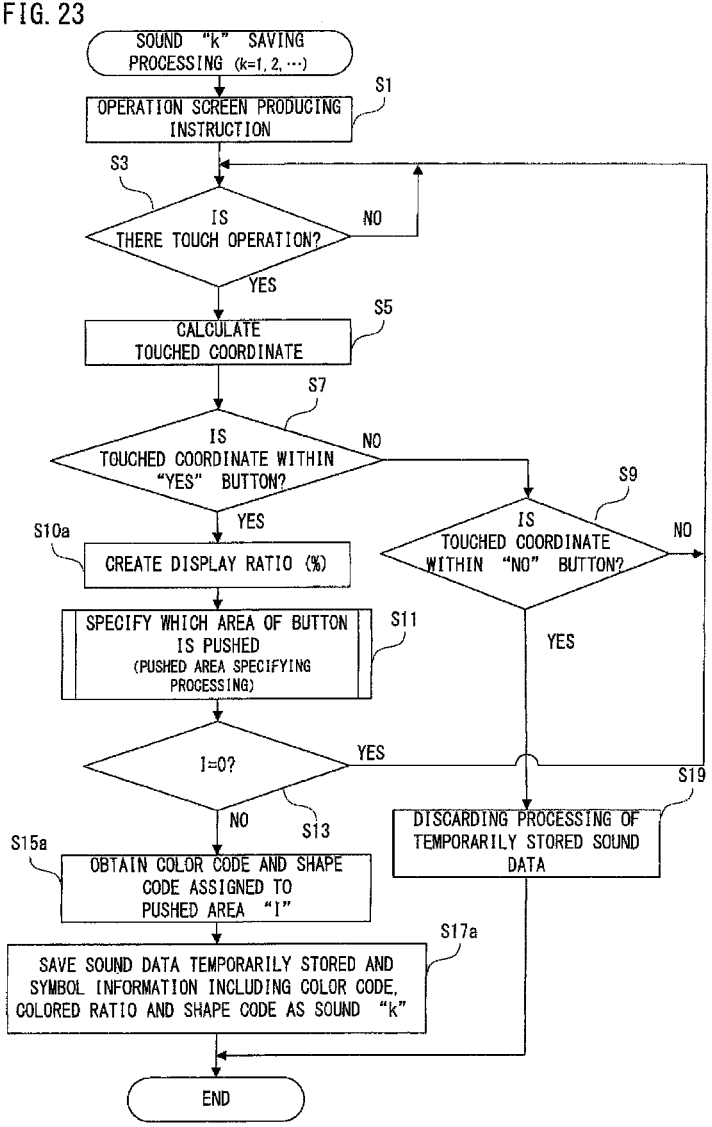
FIG. 23 is an illustrative view showing a part of an operation by the CPU in FIG. 20 embodiment.

The button information corresponding to such a "Yes" button By is described as shown in FIG. 22, for example. Then, the sound "k" saving processing is as shown in FIG. 23. The sound "k" saving processing is processing of adding a step S10a directly after the step S7: YES, and replacing the steps S15 and S17 with steps S15a and S17a in that processing (FIG. 10) of the first embodiment. The step S10a is processing the same as that (FIG. 19) of the second embodiment. In the step S15a, two codes, that is, a color code and a shape code assigned to the push area "I" are read from the button information (FIG. 22). The step S17a is processing the same as that (FIG. 19) of the second embodiment. However, there is a difference in that the shape code included in the symbol information is the shape code obtained in the step S10b in the second embodiment, but it is the shape code obtained in the step S15a in the third embodiment.

Figure 24:
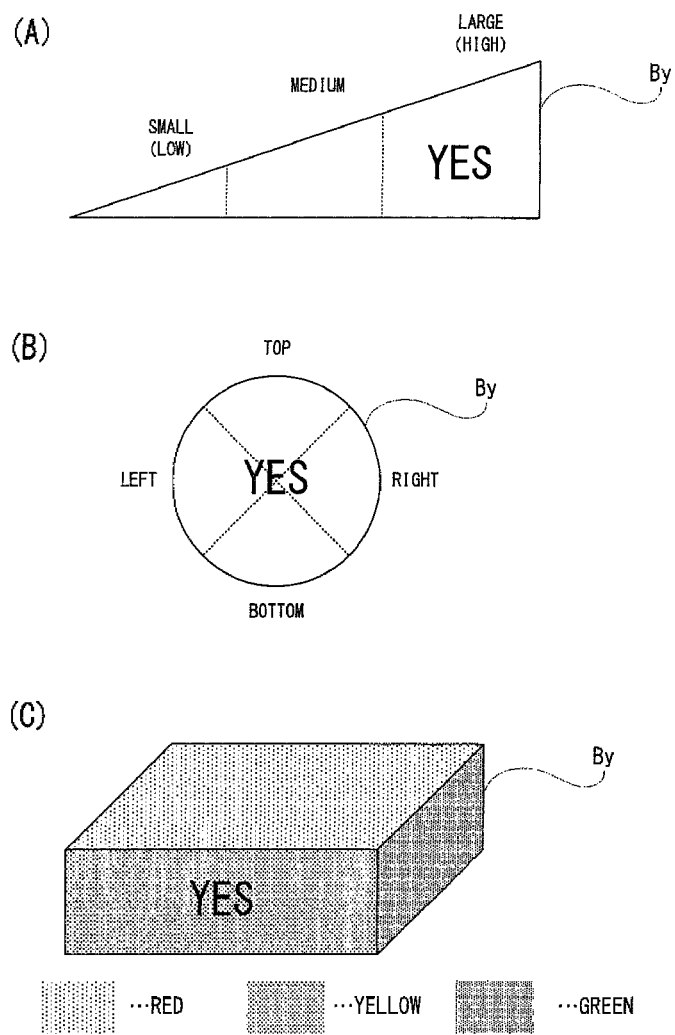
FIG. 24(A) is an illustrative view showing another button.
FIG. 24(B) is an illustrative view showing a still another button.
FIG. 24(C) is an illustrative view showing a further another button.

Additionally, in each of the embodiments, the shape of the "Yes" button By is a quadrangle, but it may be other shapes except for this, such as a triangle shown in FIG. 24(A) and a circle shown in FIG. 24(B), for example. Moreover, the shape is not limited to a plane figure, and may be a solid figure such as a rectangular parallelepiped shown in FIG. 24(C) and a solid figure such as a sphere not shown. The shape of the areas E1, E2, . . . may arbitrarily be changed in associated with the shape of the "Yes" button By or irrespective thereof.

In a case of a triangle button shown in FIG. 24(A), three sizes of three areas, large, medium, and small may be associated with three sizes of symbols, large, medium, and small. Depending on the height from the base of the pushed position, a vertically long display or a horizontally long display of the symbol can be made. Beyond the display manner of the symbol, a control of changing a compression ratio in saving a sound depending on a pushed position is also possible. In a case of a circle button in FIG. 24(B), it may be possible that a direction of the symbol can be changed depending on which part of the area is pushed, the left, right, top and bottom, for example. In a case of a rectangular parallelepiped button in FIG. 24(C), it may be possible that three faces are displayed in different colors, and depending on the pushed face, the color of the symbol is changed. Moreover, by sectioning each face into a plurality of areas and changing the shape of the symbol depending on a pushed position within the face, a plurality of conditions, such as a color and a shape may be set depending on the pushed face and the pushed position within the face. Here, in order to make the set condition easily viewable for each area, in a case that the condition is the shape, for example, different shapes may be decolorized.

Furthermore, assigning the areas E1, E2, . . . to the "NO" button Bn is performed, and depending on which area of the "NO" button Bn is pushed, the manner of the discarding processing (S19) may be changed. For example, if the area E1 is pushed, the sound data temporary memory area 82 is cleared while if the area E2 is pushed, it is not cleared. Alternatively, the processing may be branched depending on which area of the "NO" button Bn is pushed. Example is that if the area E1 is pushed, the process returns to a recording mode while if the area E2 is pushed, the process shifts to a game mode.

Additionally, an object to which the areas E1, E2, . . . are assigned is not limited to the "Yes" button By and the "NO" button, and it may be a "Next" button (not illustrated), for example. In this case, depending on which area is pushed, a page to be jumped may be changed. These areas can be assigned to an arbitrary area (command area) defined in the virtual space, such as an icon, an object, etc. other than the button. In addition, the position designating operation is not limited to a pushing operation of the button (correctly, touching operation of the button on the screen), and any operation is possible if it is an operation capable of designating an arbitrary position within the command area, such as a double-clicking operation, for example.

In the above description, the game apparatus 10 is explained as one example, but this invention can be applied to an information processing apparatus having a display, a pointing device (stylus pen, touch pad, track ball, mouse, etc.) capable of designating an arbitrary position within the display, and a computer (processor) capable of processing the information (sound data, image data, text data, etc.) on the basis of the position designated with the pointing device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory recording medium storing an information processing program, wherein the information processing program, when executed, causes a computer of an information processing apparatus including a display and a pointing device capable of designating an arbitrary position within the display to perform operations comprising:
displaying a command button on the display, the command button including multiple areas;
receiving data specifying which of the multiple areas within the command button is designated, when the pointing device designates an arbitrary position within the command button and the command button is activated; and
in response to a single activation of the command button, performing both (i) a first process for storing first information regardless of the area designated by the pointing device when the command button is activated, and (ii) one of a plurality of second processes, each second process for storing respective second information different from the first information and the one of the second processes which is performed being determined in dependence on the area designated by the pointing device when the command button is activated.

2. The recording medium according to claim 1, wherein the information processing apparatus further includes a memory for storing the respective second information associated with the second processes.

3. The recording medium according to claim 2, wherein the first information is stored for subsequent output, and the respective second information indicates different manners associated with outputting the first information.

4. The recording medium according to claim 3, wherein the respective second information stored by the second processes comprises information for a display associated with the output of the first information.

5. The recording medium according to claim 4, wherein the respective second information for the second processes comprises a display color.

6. The recording medium according to claim 5, wherein each area within the command button has a display color associated therewith.

7. The recording medium according to claim 6, wherein the areas have different color gradations.

8. The recording medium according to claim 1, wherein the respective second information for the second processes comprises respective display information for displaying a symbol associated with the first information.

9. An information processing apparatus, comprising:
a display for displaying a command button, the command button including a plurality of areas;
a pointing device capable of designating an arbitrary position within the display; and
a processing system responsive to a single activation of the command button for performing both (i) a first process for storing first information regardless of the area of the command button designated by the pointing device when the command button is activated, and (ii) one of a plurality of second processes, each second process for storing respective second information different from the first information and the one of the second processes which is performed being determined in dependence on the area within the command button designated by the pointing device when the command button is activated.

10. A non-transitory recording medium storing an information processing program, which when executed, causes a computer of an information processing apparatus including a display and a pointing device capable of designating an arbitrary position within said display to perform operations comprising:
displaying a command button on the display, the command button including multiple areas;
associating a different second process with each of multiple areas within the command button, each second process for storing respective second information;
receiving data specifying which area within the command button is designated when the pointing device designates an arbitrary position within the command button and the command button is activated; and
in response to a single activation of the command button, performing both (i) a first process for storing first information regardless of the area within the command button which is designated when the command button is activated, and (ii) one of the second processes in dependence on the area within the command button designated when the command button is activated, wherein
the respective second information is different from the first information.

11. A method performed using a computer of an information processing apparatus including a display and a pointing device capable of designating an arbitrary position within the display, the method comprising:

displaying a command button on the display, the command button including multiple areas;

receiving information specifying which of the multiple areas within the command button is designated when the pointing device designates an arbitrary position within the command button, each of the multiple areas being associated with a different second process, each second process for storing respective second information different from the first information; and in response to a single activation of the command button, performing both (i) a first process for storing first information regardless of the area of the command button designated by the pointing device when the command button is activated, and (ii) one of the second processes in dependence on the area of the command button designated when the command button is activated.

* * * * *

UNITED STATES PATENT AND TRADEMARK OFFICE
CERTIFICATE OF CORRECTION

| | | |
|---|---|---|
| PATENT NO. | : 8,910,085 B2 | |
| APPLICATION NO. | : 12/539820 | |
| DATED | : December 9, 2014 | |
| INVENTOR(S) | : Miyamoto et al. | |

It is certified that error appears in the above-identified patent and that said Letters Patent is hereby corrected as shown below:

On the Title Page, Item (56) under OTHER PUBLICATIONS, please insert:

--Office Action dated June 26, 2012 in JP Application No. 2008-252532--

Signed and Sealed this
Fourteenth Day of April, 2015

Michelle K. Lee
*Director of the United States Patent and Trademark Office*